(12) United States Patent
Huemmer et al.

(10) Patent No.: US 11,790,496 B2
(45) Date of Patent: Oct. 17, 2023

(54) IMAGE NORMALIZATION INCREASING ROBUSTNESS OF MACHINE LEARNING APPLICATIONS FOR MEDICAL IMAGES

(71) Applicant: Siemens Healthcare GmbH, Erlangen (DE)

(72) Inventors: Christian Huemmer, Lichtenfels (DE); Ramyar Biniazan, Nuremberg (DE); Andreas Fieselmann, Erlangen (DE); Steffen Kappler, Effeltrich (DE)

(73) Assignee: Siemens Healthcare GmbH, Erlangen (DE)

( * ) Notice: Subject to any disclaimer, the term of this patent is extended or adjusted under 35 U.S.C. 154(b) by 288 days.

(21) Appl. No.: 17/204,030

(22) Filed: Mar. 17, 2021

(65) Prior Publication Data

US 2021/0304361 A1    Sep. 30, 2021

(30) Foreign Application Priority Data

Mar. 31, 2020 (EP) ..................................... 20166951

(51) Int. Cl.
*G06T 5/00* (2006.01)
*G06N 20/00* (2019.01)
(Continued)

(52) U.S. Cl.
CPC ............... *G06T 5/007* (2013.01); *G06N 3/04* (2013.01); *G06N 20/00* (2019.01); *G06T 3/4084* (2013.01);
(Continued)

(58) Field of Classification Search
None
See application file for complete search history.

(56) References Cited

U.S. PATENT DOCUMENTS 10,762,398 B2 *  9/2020  Sjölund ................. G06T 11/008
11,501,438 B2 * 11/2022  Xu .......................... G06F 17/18
(Continued)

FOREIGN PATENT DOCUMENTS

CN       110400275       *  7/2019
JP       2010220742      *  3/2009

OTHER PUBLICATIONS

Localized Energy-Based Normalization of Medical Images: Application to Chest Radiography; Philpsen etal (Year: 2015).*
(Continued)

*Primary Examiner* — Nancy Bitar
(74) *Attorney, Agent, or Firm* — Harness, Dickey & Pierce, P.L.C.

(57) ABSTRACT

A computer program, a system and a method for normalizing medical images from a type of image acquisition device using a machine learning unit are disclosed. An embodiment of the method includes receiving a set of image data with images; decomposing each of the images of the set of images into components by incorporating at least information from different settings of the image acquisition device-specific image processing algorithms; and normalizing each of the components via a machine learning unit by processing at least information from the different settings of the image (Continued)

acquisition device-specific processing algorithms to provide a set of normalized images with a relatively decreased variability score.

18 Claims, 3 Drawing Sheets

(51) Int. Cl.
| | |
|---|---|
| *G06N 3/04* | (2023.01) |
| *G06V 10/50* | (2022.01) |
| *G06V 30/24* | (2022.01) |
| *G06T 3/40* | (2006.01) |
| *G06T 5/40* | (2006.01) |
| *G06T 7/00* | (2017.01) |

(52) U.S. Cl.
CPC .............. *G06T 5/009* (2013.01); *G06T 5/40* (2013.01); *G06T 7/0012* (2013.01); *G06V 10/50* (2022.01); *G06V 30/2504* (2022.01)

(56) References Cited

U.S. PATENT DOCUMENTS

| | | | |
|---|---|---|---|
| 2012/0321151 A1 | 12/2012 | Zöhrer et al. | |
| 2018/0025290 A1* | 1/2018 | Al Hatib | G06N 20/00 |
| | | | 706/12 |
| 2019/0332900 A1* | 10/2019 | Sjolund | G06T 9/002 |
| 2020/0051550 A1* | 2/2020 | Baker | G06N 3/084 |
| 2020/0193296 A1* | 6/2020 | Dixit | G06N 3/045 |

OTHER PUBLICATIONS

Neath, L. H., "CheXNet2: End-to-end Improvements for Chest Disease Classification", https://cs230.stanford.edu/projects_spring_2018/reports/8290537.pdf.

The Laplacian Pyramid as a Compact Image Code,Peter J. Burt, Edward H. Adelson,; Peter J. Burt et al. "The Laplacian Pyramid as a Compact Image Code", IEEE Transactions on Communications, vol. Com-31, No. 4, Apr. 1983.

Vidya, M. S. et al., "Local and Global Transformations to Improve Learning of Medical Images Applied to Chest Radiographs", SPIE 2019.

Philipsen R H H M et al.: "Localized Energy-Based Normalization of Medical Images: Application to Chest Radiography", IEEE Transactions On Medical Imaging, IEEE Service Center, Piscataway, NJ, US, vol. 34, No. 9, Sep. 1, 2015, pp. 1965-1975.

Zoehrer, F. et. al., "Interactive Multi-scale Contrast Enhancement of Previously Processed Digital Mammograms", IWDM 2010: Digital Mammographypp, pp. 31-38.

Guendel, S. et al., Learning to recognize abnormalities in chest X-rays with location-aware dense networks, arXiv 1803.04565; Mar. 12, 2018; 9 pp; 2018.

European Search Report for European Application No. 20166951 dated Sep. 10, 2020.

European Communication pursuant to Article 94(3) datedd Sep. 5, 2022.

European Intention to Grant dated Nov. 14, 2022.

\* cited by examiner

IMAGE NORMALIZATION INCREASING ROBUSTNESS OF MACHINE LEARNING APPLICATIONS FOR MEDICAL IMAGES

PRIORITY STATEMENT

The present application hereby claims priority under 35 U.S.C. § 119 to European patent application number EP20166951.2 filed Mar. 31, 2020, the entire contents of which are hereby incorporated herein by reference.

FIELD

Example embodiments of the invention generally relate to image processing and in particular to medical imaging.

BACKGROUND

Medical image processing provides support for doctors when evaluating medical images taken from patients. Computerized systems assist doctors and/or medical professionals in making decisions on the presence of disease.

Image processing is meanwhile a typical field for Machine Learning (ML). The progress in processing speed of computers, memory capacity etc. and the possibility to collect and process huge amounts of digital data lead to major improvements in Machine Learning. In general, Machine Learning is the use of computers (machines) in terms of hardware and software in order to make predictions from huge data sets. Machine learning algorithms are usually computer programs. One major difference to the classical software development consists in that the Machine Learning system discloses (learns) relationships between input and output data from data sets. Such relationships may not be known in advance. How the data are processed can change over the time. That is considered to be the learning process.

Neural networks are among others a tool for machine learning. If the neural network consists of several layers, comprising a large number of neurons, it usually allows Deep Learning. One type of neural networks is the convolutional neural network. It comprises different types of layers including convolutional layers. As a result of mathematical processes key features of images are emphasized by convolution.

The ML system is trained by specific training data sets. Test data sets are used to validate the training results. Once the system is trained and tested sufficiently it can be considered for real-world deployment, in particular in the medical domain. The quality of the data sets used play a major role in the efficiency of the ML system.

Medical image data of patients will be provided to the ML system which will suggest diagnoses to the doctor. Reliability of diagnosis is improved with more accurate data.

Medical imaging is typically influenced by three types of variabilities:
1) The acquisition depends on the hard- and software configuration of the recording device.
2) The shape of the anatomical structures varies with the relative positioning and characteristics (e.g., age, gender) of the patient.
3) The recorded information (e.g., photon energy) is processed to produce a vendor- and application-specific representation, which is adjustable to the demands of the examining doctor.

A first method is image impression conversion. In the literature several methods for transformations between image impressions have been reported.

For instance, US2012/0321151 introduces a method for conversion of image impression to enable current and prior image comparison in mammography. An input image is decomposed into high-pass images and a low-pass image. Adjusting values are determined and applied to the high-pass images and the low-pass image. Finally, an adjusted image is created. However, the method is designed for visual image comparison and not intended to be used for optimization of machine learning training.

A second method is image normalization for machine learning. Image normalization is normally understood as the change of the intensity values in an image. Evaluation of medical images requires a specific image quality in order to find diseases based on images comparable from a technological perspective.

Normalization of medical images has been addressed in various publications. For instance, researches of Phillips Healthcare investigated several methods for image normalization in [M. S. Vidya et al.: "Local and Global Transformations to Improve Learning of Medical, Images Applied to Chest Radiographs", SPIE 2019v]. Well-known global (e.g., histogram-based equalization) and spatially local (e.g., adaptive histogram equalization) methods were applied to chest X-ray images. These transformations are well-known techniques for RGB images and have been directly applied to the input image, without decomposition. The pre-processed images are input for the DenseNet-121 Classifier. However, the pre-processed images are not optimized to explicitly address the variability produced by different image impressions, as mentioned above under item 3) "variability".

Further examples for global histogram normalization are stretching methods which aim at reducing the impact of histogram outliers on the ML algorithm accuracy (e.g., [S. Guendel et al.: "Learning to Recognize Abnormalities in Chest X-Rays with Location-Aware Dense Networks", CIARP 2018]).

A pre-processing method that applies a Laplacian image decomposition and energy normalization with subsequent image composition is described in [L. H. Neath: "CheXNet2: End-to-end Improvements for Chest Disease Classification", https://cs230.stanford.edu/projects_spring_2018/reports/8290537.pdf]. The pre-processed medical images improved the classification performance of the neural network. Nevertheless, the introduced component-wise energy normalization does not explicitly address variability 3) produced by different configurations of image acquisition device-specific image processing techniques.

SUMMARY

The application of ML techniques to medical image interpretation is generally based on the assumption that all sources of image variabilities 1) to 3) are captured by the training data. However, the inventors have discovered that this is often impractical and leads to the well-known problem that mismatches between training and testing/deployment (real world) conditions might produce unpredictable results. As particularly severe clinical consequence for variability 3), the assessment of the same recorded information could be dependent on the configuration of the image processing technique: Different image impressions (e.g., characterized by specific contrast, sharpness and brightness) can result from the alternation of physical parameters with different settings of an image acquisition device-specific processing technique, e.g. in radiography, ultrasound, computed tomography, magnetic resonance imaging.

Therefore, a problem that an embodiment of this invention aims to address is that the variability, mentioned above under item 3), caused by processing the recorded information with different image impressions can lead to a lower accuracy when unaccounted for in (deep) machine learning.

Based on the above mentioned drawbacks of the state of the art in pre-processing of images and their application for machine learning, at least one embodiment of the present invention provides a solution which increases the robustness of machine learning algorithmic task. In particular, the training of a neural network should be improved for images resulting from the same type of modality or more general image acquisition device but from different image processing techniques. Finally, variabilities in image impression or image impression deviations should be reduced, which are caused by image acquisition device-specific image processing algorithms.

Embodiments are directed to a method, respective computer program product and system. Advantageous aspects, features and embodiments are described in the dependent claims and in the following description together with advantages.

In the following, at least one embodiment of the invention is described with respect to the method as well as with respect to the system. Features, advantages or alternative embodiments which are described or claimed in relation to one claim category can also be assigned to the other claim categories (e.g. the computer program or a computer program product) as well and vice versa. In other words, the subject matter according to the claims of the system can be improved with features described or claimed in the context of the method. In this case, the functional features of the method are embodied by structural units of the system (processing units, e.g., normalizing is executed by a normalization unit) and vice versa, respectively.

According to a first embodiment, the present invention refers to a computer-implemented method (i.e. executed on a processing unit of a computer, which may e.g. be deployed in an image acquisition or processing apparatus) for normalizing medical images. In a preparation phase, a type of image acquisition device may be set for which the method should be applied (e.g. X-ray, MRI, CT etc.). Thus, the images stem from a predetermined type of image acquisition device (in the medical domain also called 'modality'). The method uses a machine learning unit and comprises:

receiving a set of image data with images, in particular medical images from the predetermined type of image acquisition device, at a decomposition unit, wherein the image data have been generated by being converted from detector signals, acquired at a detector of an image acquisition device (e.g. medical modality), wherein the detector signals are converted by using or applying different settings or configurations of the image acquisition device-specific processing algorithms;

at a decomposition unit: Decomposing each of the images of the set of images into components by incorporating at least information from the different settings of the (applied) image acquisition device-specific processing algorithms; and at a normalizing unit: Normalizing each of the components via a machine learning unit by processing at least information from the different settings of the image acquisition device-specific processing algorithms to provide a set of normalized images as output with a decreased variability score.

In another embodiment, the invention relates to a system for normalizing medical or non-medical images from a predetermined type of image acquisition device using a machine learning unit. The system is computer-based and comprises:

a decomposition unit with an image input interface for receiving a set of image data with images, wherein the image data have been generated by being converted from detector signals, acquired at a detector of an image acquisition device, wherein the detector signals are converted by applying different settings of configurations in the image acquisition device-specific image processing algorithms;

wherein, the decomposition unit, incorporates at least information from the different settings in the modality-specific image processing algorithms and is adapted for decomposing each of the images of the set of images into components; and a normalizing unit, which is adapted for normalizing each of the components via a machine learning unit by processing at least information from the different settings of the image acquisition device-specific image processing algorithms to provide a set of normalized images with a decreased variability score.

In another embodiment, the invention relates to a computer program product comprising a computer program, the computer program being loadable into a memory unit of a computing unit, including program code sections to make the computing unit execute the method for image normalization according to an embodiment of the invention, when the computer program is executed in the computing unit.

In another embodiment, the invention relates to a computer-readable medium, on which program code sections of a computer program are stored or saved, the program code sections being loadable into and/or executable in a computing unit to make the computing unit execute the method for image normalization according to an embodiment of the invention, when the program code sections are executed in the computing unit.

In another embodiment, the invention relates to a computer program, the computer program being loadable into a memory unit of a computer, in particular, of an image processing or image acquisition device.

In another embodiment, the invention relates to a computer-implemented method for normalizing images from a type of image acquisition device using a machine learning unit, the method comprising:

receiving a set of image data with images, the image data having been generated by being converted from detector signals, acquired at a detector of an image acquisition device, wherein the detector signals were converted by applying different settings in image acquisition device-specific processing algorithms;

decomposing each of the images of the set of image data into components, by incorporating at least information from the different settings of the image acquisition device-specific processing algorithms; and normalizing each of the components via the machine learning unit to produce normalized components, by processing at least information from the different settings of the image acquisition device-specific processing algorithms to provide a set of normalized images with a relatively decreased variability score.

In another embodiment, the invention relates to a system for normalizing medical images from a type of image acquisition device using a machine learning unit, comprising:

a decomposition unit including an image input interface, to receive a set of image data with images, the image data having been generated by being converted from detector signals, acquired at a detector of an image acquisition device, the detector signals having been converted by applying different settings of image acquisition device-specific processing algorithms, and adapted to decompose each of the images of the set of images into components by incorporating at least information from the different settings of the image acquisition device-specific processing algorithms; and a normalizing unit, adapted to normalize each of the components via a machine learning unit, by processing at least information from the different settings of the image acquisition device-specific processing algorithms to provide a set of normalized images with a relatively decreased variability score.

In another embodiment, the invention relates to a non-transitory computer program product storing a computer program, the computer program being loadable into a memory unit of a computing unit and including program code sections to make the computing unit execute the method of an embodiment, when the computer program is executed in the computing unit.

In another embodiment, the invention relates to an image acquisition image acquisition device, comprising:

the system of an embodiment.

BRIEF DESCRIPTION OF THE DRAWINGS

These and other aspects of the invention will be apparent from and elucidated with reference to the embodiments described hereinafter.

DETAILED DESCRIPTION OF THE EXAMPLE EMBODIMENTS

Figure 1:
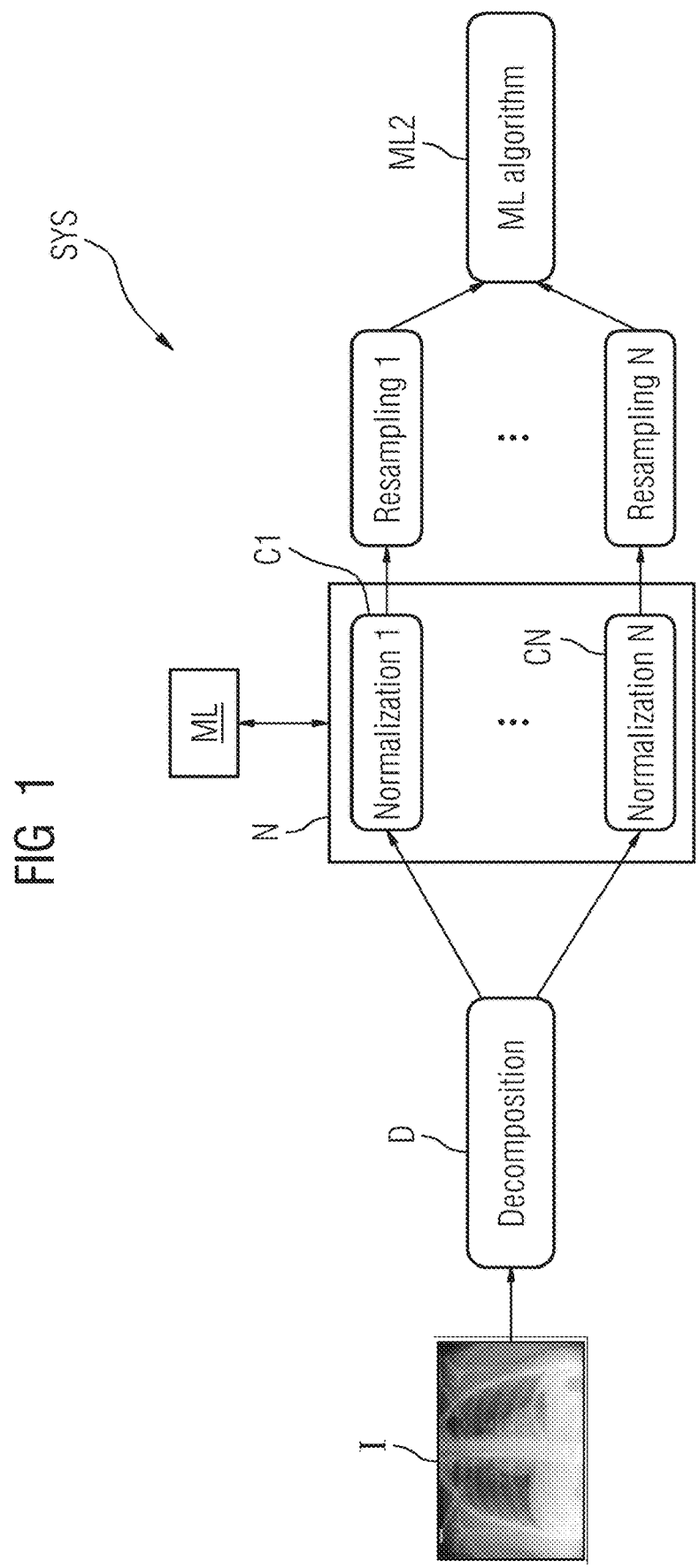
FIG. 1 indicates a block diagram of the general pipeline for normalizing medical images.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. At least one embodiment of the present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one embodiment of the invention relates to the non-transitory computer-readable storage medium including electronically readable control information (procesor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

According to a first embodiment, the present invention refers to a computer-implemented method (i.e. executed on a processing unit of a computer, which may e.g. be deployed in an image acquisition or processing apparatus) for normalizing medical images. In a preparation phase, a type of image acquisition device may be set for which the method should be applied (e.g. X-ray, MRI, CT etc.). Thus, the images stem from a predetermined type of image acquisition device (in the medical domain also called 'modality'). The method uses a machine learning unit and comprises:

receiving a set of image data with images, in particular medical images from the predetermined type of image acquisition device, at a decomposition unit, wherein the image data have been generated by being converted from detector signals, acquired at a detector of an image acquisition device (e.g. medical modality), wherein the detector signals are converted by using or applying different settings or configurations of the image acquisition device-specific processing algorithms;

at a decomposition unit: Decomposing each of the images of the set of images into components by incorporating at least information from the different settings of the (applied) image acquisition device-specific processing algorithms; and at a normalizing unit: Normalizing each of the components via a machine learning unit by processing at least information from the different settings of the image acquisition device-specific processing algorithms to provide a set of normalized images as output with a decreased variability score.

Thus, the normalization unit provides normalized images as output which are normalized for all the different image impressions. The different image impressions (image renderings) are due to applying different configurations or settings for signal processing at the acquisition device or modality. In particular, a user, e.g. a radiologist may tune or set his own preferences (configurations) for detector signal processing. It is important to note, that the term "image impressions" does not relate to cognitive image impressions of a user, but to hardcoded settings or configurations for raw detector signal processing, namely to configurations which are used for converting the raw detector signals into image data. In each image to be rendered, these configurations or settings are kind of hardcoded or burnt-in. Usually, these configurations are configured one time after first commissioning of the image acquisition device. The configurations may be set by a dedicated configuration software which is only operated for commissioning of the image acquisition device. Usually, the user or operator the image acquisition device does not have access to this configuration software tool, which is provided by the manufacturer of the devices. The configurations are usually not amended or changed afterwards and during operation of the image acquisition device. The configurations are implicitly coded in the generated images, but are not explicitly available (e.g. in a data memory). The image impression is thus dependent on these configurations mentioned above, namely of image acquisition device-specific processing algorithms or types thereof or in particular of modality specific processing algorithms. The image impression may relate to different parameters, comprising contrast, brightness, image sharpness/level of detail etc.

At least one embodiment of the invention is based on the observation that the variability of the image impressions is very high although the same type of device or modality is used. This is a major problem for subsequent image analyses and diagnosis. This information from the settings or configurations is taken into account for normalizing the images.

On a very general level, at least one embodiment of the invention proposes a first normalization block which may be used for subsequent machine learning algorithms (in short ML algorithms) for diverse tasks. The ML algorithms may be executed subsequently in a second block, in particular, executed in a processing unit and are based on the results of the first normalization block. In this embodiment the system comprises the first and the second block, i.e. the normalization and the task specific ML block as well. However, in another embodiment, it is also possible to only use the first normalization block. Images are provided as input to the first block (normalization block) and normalized images are provided as output of this first block.

As mentioned above, the normalized images may be subject to a further processing, e.g. by way of a neural network algorithm or any other image processing. Thus, in a preferred embodiment, the computer-implemented method may further comprise:

Receiving the normalized components at an input interface of a second machine learning unit and executing a second machine learning algorithm with the normalized components for a pre-defined task, wherein the normalized components are e.g. entered as feature maps of a convolutional layer of a neural network.

With other words, parameters of both (normalization and task specific) sequential ML units are jointly trained using the cost function of the second ML algorithm. This is referred to as end-to-end training and typically realized by representing both sequential ML units as one neural network.

The training data set still comprises the variabilities due to hardware and/or software settings of the image acquisition device (modality) and due to patient-specific or anatomical parameters. Thus, only variability 3) as mentioned above is reduced (due to configurations or setting in the modality-specific rendering algorithms).

One key advantage of at least one embodiment of the present invention is that the quality of subsequent image processing techniques, in particular machine learning algorithms for image evaluation (with respect to diseases, to be executed in the second block) is improved. Further, training of the neural networks may be much more efficient, because the variability (as mentioned above as 3) aspect) produced by different image impressions is reduced in the first (normalization) block. This helps to remarkably reduce the amount of training data and leads to a better generalization across various image impressions.

In another preferred embodiment, the (first) machine learning unit and/or a second machine learning unit is a neural network, in particular a deep neural network and/or a convolutional neural network, which typically will be deployed as a deep convolutional neural network.

In another preferred embodiment, the step of decomposing comprises a pyramid decomposition. One technical advantage of this method is that it represents an image as a series of components with reduced entropy. For more details it is referred to [The Laplacian Pyramid as a Compact Image Code, P. Burt et al, in: IEEE TRANSACTIONS ON COMMUNICATIONS, VOL. COM-31, NO. 4, APRIL 1983], the entire contents of which are hereby incorporated herein by reference.

In another preferred embodiment, each of the images is decomposed into frequency bands, resulting in so called band-pass images.

In another preferred embodiment, decomposing is executed by wavelet transformation or by Fourier transformation or by Laplace transformation.

In another preferred embodiment, normalizing each of the components is executed by histogram equalization or mean and variance normalization.

The normalization procedure preferably comprises 1) an image acquisition device-dependent topology based on explicit knowledge of the generation of different image impressions (e.g. the decomposition of an image into specific frequency bands, which are parameterisably and distorted in the devices) and 2) a set of parameters $\Phi$ (e.g. for normalization, see examples below).

The application of such a normalization procedure for the robustification of ML algorithms by explicit reduction of the variability of different image impressions is a new concept. To define the topology of the normalization procedure, explicit knowledge about the generation of different image impressions is used.

Thus, a (first) machine learning algorithm (and corresponding neural network) is used for determining the normalization parameters and a second or other machine learning algorithm (and corresponding second neural network) may subsequently be applied for any task which has to be executed on the provided normalized images.

Parameters of both networks may be trained in common, i.e. parameters Φ of the normalization network (first block) with parameters Ω of the subsequent task-specific ML algorithm (second block).

There do exist several options for calculating the set of parameters Φ for normalization:

1) Manual determination (e.g. normalization of frequency bands to an average value of 0);

2) Independent training of the ML algorithm which is used for normalization compared to the one for training of the subsequent task-specific ML algorithm. Independent training means using a separate, own cost function (e.g. with the aim of calculating the mean values of frequency bands to the corresponding mean values of a reference image impression);

3) Training all or a subset of the set of parameters Φ for normalization as part of the task-specific ML algorithm=cost function of the ML algorithm:

All or a subset of the parameters Φ and Ω are learned together

The resulting information at the output of the normalization is objective of the ML algorithm is optimized and can be very much influenced by a deviate from clinically relevant image impression.

In another preferred embodiment, the method comprises:

Resampling of each of the components, in particular with respect to resolution. For example, if an input image is provided in a very high resolution, for which the decomposition and normalization is derived from the creation of different image impressions, but the subsequent image processing of the second ML-block does not need this high resolution, resampling may be used. This may help to reduce storage and processing capacities.

In another preferred embodiment, a verification algorithm may be executed after providing the normalized images (output or result of the first block). The verification algorithm may comprise the step of superimposing the normalized components on each of the images thereby creating superimposed images.

In another preferred embodiment, the images represent medical images from a preset type of image acquisition device (Computer tomography/CT, x-ray, ultrasound, magnetic resonance tomography, etc.). However, also non-medical images may be subject to the processing, explained herein, e.g. RGB images.

In another preferred embodiment, normalizing comprises a global and/or a local normalization by locally normalizing all extracted components on a spatially local manner.

In another preferred embodiment, normalizing the components via the machine learning unit is executed by using image processing knowledge of the image and applied image processing techniques. In particular, the processing knowledge may comprise knowledge about the image processing steps which have been applied to convert the detector signals, received from the image acquisition device's detector to provide an image representation. Moreover, the processing knowledge may in addition comprise:

processing anatomical information comprising identification of e.g. anatomical structures (e.g. organ or structure segmentation) in case of medical images and/or processing patient information, comprising relative positioning of the patient in the image acquisition image acquisition device and/or processing patient characteristics, i.e. data relating to the patient which is examined and represented in the image set, like age, sex, height, weight etc.

processing image acquisition device information, e.g., physical settings like voltage, emitted photon energy or detector type.

This makes it possible to egalize the image impression between different images sets (e.g. image studies, DICOM sets) from a preset image acquisition device (e.g. radiological images), which have been processed with different image processing steps (algorithms). For instance, various image impressions for X-ray images can be created by performing a photon energy normalization of the detector information, followed by noise reduction and gamma filtering for logarithmic scaling, and a parameterized nonlinear weighting of different frequency components. The last processing step comprises a decomposition step (e.g., a Laplacian pyramid decomposition, for more details see also [The Laplacian Pyramid as a Compact Image Code, P. Burt et al, in: IEEE TRANSACTIONS ON COMMUNICATIONS, VOL. COM-31, NO. 4, APRIL 1983]), component-wise configurable nonlinear transformations (which can be adjusted to the radiologist's demands) and a final composition step (e.g., a weighted superposition).

In another preferred embodiment, normalizing may use and apply a sliding window technique. A sliding window technique relates to an optimization algorithm for data processing in order to reduce the time complexity to O(n). An example for local image normalization is the application of histogram equalization or mean and variance normalization for small image regions, which are extracted by shifting a rectangular window over the image. One technical advantage of exploiting spatially local techniques is that the contrast in very light or dark regions can be remarkably enhanced.

In another preferred embodiment, the hyperparameters (e.g. percentile of histogram-based equalizations) and/or the parameters of the normalization are not pre-set, but instead are determined and learned (calculated) by the machine learning algorithm. For example, during normalization, particular frequency bands may be selected due to image acquisition device-specific knowledge of the image processing algorithms. For example, the amount of the frequency bands to be used may represent a hyperparameter of the normalization. This parameter may be subject of adaption and may be adapted during training of the ML algorithm.

In another embodiment, the invention relates to a system for normalizing medical or non-medical images from a predetermined type of image acquisition device using a machine learning unit. The system is computer-based and comprises:

a decomposition unit with an image input interface for receiving a set of image data with images, wherein the image data have been generated by being converted from detector signals, acquired at a detector of an image acquisition device, wherein the detector signals are converted by applying different settings of configurations in the image acquisition device-specific image processing algorithms;

wherein, the decomposition unit, incorporates at least information from the different settings in the modality-specific image processing algorithms and is adapted for decomposing each of the images of the set of images into components; and a normalizing unit, which is adapted for normalizing each of the components via a machine learning unit by processing at least information from the different settings of the image acquisition device-specific image processing algorithms to provide a set of normalized images with a decreased variability score.

In another embodiment, the invention relates to a computer program product comprising a computer program, the computer program being loadable into a memory unit of a computing unit, including program code sections to make the computing unit execute the method for image normalization according to an embodiment of the invention, when the computer program is executed in the computing unit.

In another embodiment, the invention relates to a computer-readable medium, on which program code sections of a computer program are stored or saved, the program code sections being loadable into and/or executable in a computing unit to make the computing unit execute the method for image normalization according to an embodiment of the invention, when the program code sections are executed in the computing unit.

In another embodiment, the invention relates to a computer program, the computer program being loadable into a memory unit of a computer, in particular, of an image processing or image acquisition device.

The realization of embodiments of the invention by a computer program product and/or a computer-readable medium has the advantage that already existing modalities and servers can be easily adopted by software updates in order to work as proposed by embodiments of the invention.

The properties, features and advantages of this invention described above, as well as the manner they are achieved, become clearer and more understandable in the light of the following description and embodiments, which will be described in more detail in the context of the drawings. This following description does not limit the invention on the contained embodiments. Same components or parts can be labeled with the same reference signs in different figures. In general, the figures are not for scale.

It shall be understood that a preferred embodiment of the present invention can also be any combination of the dependent claims or above embodiments with the respective independent claim.

Embodiments of the present invention relates to calculating normalized images for a set of images, acquired at a image acquisition device of a certain type, e.g. a radiological image acquisition device.

In the following a definition of terms used within this application is given.

The image may be a medical image with clinical content. It may be e.g. a DICOM image. The image may be generated by a certain modality as image acquisition device. The type of modality is not restricted for using the normalization method. However, the method is dedicated to a specific type, so that all images, acquired of this modality are re-calculated for being provided in a standardized form. Deviations of image impressions are equalized. Other embodiments refer to non-medical images acquired on non-medical devices, such as cameras.

Equalized impressions relate to a relation between pixel intensities, e.g., by way of contrast, brightness or sharpness.

In a preferred embodiment two different blocks or structures are used:
A normalization block and
A ML block for a certain image task (e.g. classification, regression etc.)

Both blocks may comprise or access different neural networks, in particular CNNs, with different machine learning algorithms. All or subsets of the parameters for normalization may be learned in common—in particular in one single training—with the parameters for the task specific ML algorithm, which may be executed subsequently to providing the normalized images.

Decomposing is a computer operation via a decomposition algorithm. The decomposition algorithm divides the input image in a pre-configurable set of frequency bands. Pyramid decomposition may be used in this respect. The result of decomposing is a set of decomposed or band-pass images. The band-pass images may be individually histogram-equalized or mean and variance standardized to account for pixel-value shifts produced by non-linear processing in the respective frequency band. In other embodiments any concept for decomposing an image into band-pass components, e.g., based on Fourier/Laplace or wavelet transformation may be used, too.

Normalizing is a computer operation by executing a normalizing algorithm. The normalizing algorithm adjusts pixel values of the individual band-pass images according to a global and local normalization strategy.

FIG. 1 illustrates the general pipeline for normalizing images. A set of images S with images I1 to IV is provided. The images I1 to IV have different image impressions due to processing the same detector information with different configurations of the modality-specific—or more general: image acquisition device specific—image processing technique.

In general, it has to be noted that the difference between images I1 to I5 is only produced by variability 3), as mentioned above. The recorded detector information is processed (converted) to produce a vendor- and/or application-specific image representation. These differences are not based on other influences, like anatomical variabilities.

If the images represent medical images the image impression can differ due to the shape of the anatomical structures which vary with the relative positioning and characteristics (e.g., age, gender) of a patient. It is important to note, that the provided images are created from the same detector information. There is no variability due to positioning or patient characteristics. The term "image impression" so far refers to different configurations of the image processing pipeline (on the related devices and apparatuses) to convert the same detector information to different image renderings, adjusted to the radiologists' needs.

Each of the images I1 to IV is decomposed in a decomposition unit D thereby creating components C1 to Cn. Each of the components C1 to Cn is normally resampled thereby creating resampled components CR1 to CRn which represent input for the Machine Learning unit ML. Resampling might be important for images (e.g. X-ray) with a high resolution. Images with a resolution of 3000×3000 pixel can e.g. resampled to a resolution of 1000×1000 pixel. The reduction of the resolution might be relevant for machine learning units ML which for the sake of processing efficiency work with lower resolution images. The use of the resampled components CR1 to CRn instead of the complete image (e.g. downsampling), as known from the state of the art, improves and increases the training speed. Performing the decomposition and normalization before making the downsampling is motivated by the fact that explicit knowledge on the creation of image impressions (in the device for high-res images) should be incorporated. This is a major advantage (training speed) over prior art.

The normalization results in that the image impressions (e.g. contrast, intensity) are more homogeneous but still different enough in order to achieve good training results by the machine learning unit ML. Generally, the goal of the normalization is to reduce the variability 3) produced by different image impressions. This means that the normalized image still include the variabilities 1) and 2) obtained due to patient characteristics (e.g., age, gender), patient positioning (e.g., sitting, standing) and device setting (e.g., voltage, emitted photon energy). These variabilities 1) and 2) are diverse enough to achieve good training results.

The machine learning unit ML may be adapted to receive a set of decomposed images, i.e. a set of normalized image components. A straightforward approach is to exploit three normalized image components as input channels of a deep convolutional neural network which was topologically optimized for RGB images. Alternatively, a flexible number of normalized components can be directly used as input feature maps of a deep convolutional neural network.

Generally, the system SYS is adapted for image normalization. The system SYS may be implemented on an image acquisition device or on a server in data network connection with the image acquisition device. The system SYS at least uses one neural network, in particular a CNN for determining the normalization parameters, which are used for normalizing the images I. After having calculated the set of normalized images CN, a variety of task specific additional image data processings may be carried out on the normalized images, like those which may be implemented by a second neural network or by executing second machine learning algorithms ML2.

Figure 2:
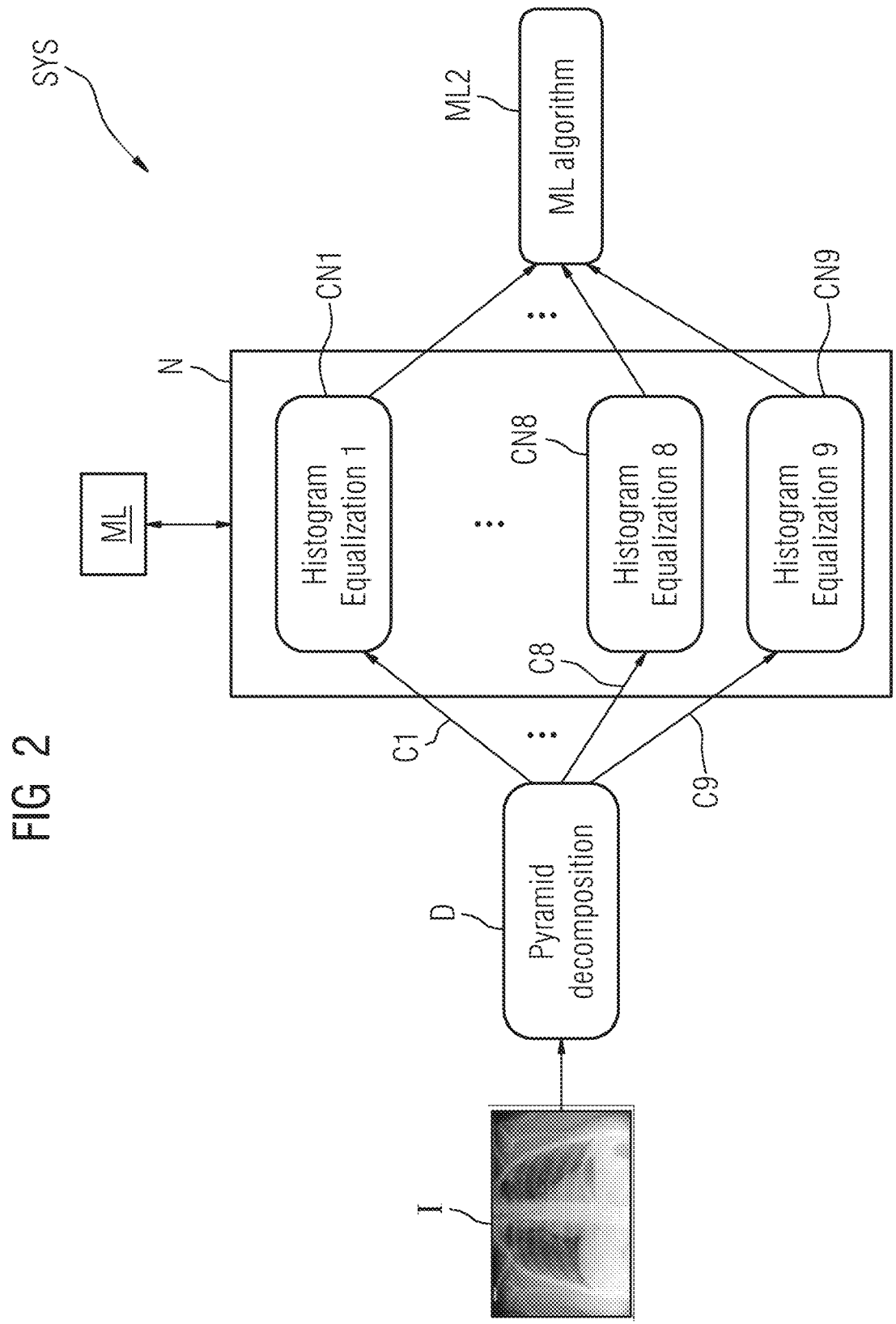
FIG. 2 indicates a block diagram of an embodiment for the pipeline for normalizing radiographical images.

FIG. 2 illustrates a specific embodiment for the application of the general pipeline for normalizing images according to FIG. 1. A set of images S with medical images I1 to IV is provided. The images I1 to IV have different image impressions created by processing the same detector information with different configurations of the modality-specific or image acquisition device-specific image processing technique.

In image processing different physical parameters (signals at the detector of the modality) are transformed or converted into image representations with possibly different image impressions (e.g. contrast, intensity) by configurable processing units. For instance, in X-ray apparatuses the measured photon energy is converted into an interpretable X-ray image. The doctors can adjust the image impression according to device settings (contrast, brightness etc.). This individual adjustment can be done by weighting components of frequency bands with parameterisable non-linearities. The huge advantage of the normalization procedure of the current invention consists in the reduced influence of the adjustable parameters specifying the non-linearities in the different frequency bands. The fundamental goal is to get the same image rendering result for different parameter settings, i.e. to unify over the image impressions which are created by changing the band-wise parameters of the nonlinearities.

The images I1 to IV differ due to the processing of the same detector information with different configurations of the modality-specific image processing technique or thus—more general—to image acquisition device-specific processing algorithms and settings.

Each of the images I1 to IV is decomposed in a decomposition unit D thereby creating components C1 to Cn.

In a preferred embodiment, the decomposition is carried out by pyramid decomposition. Each of the input images I1 to IV is decomposed into nine components C1 to C9 representing nine frequency bands. The resulting band-pass images are normalized in that each of the components C1 to C9 are individually histogram-equalized to account to pixel shifts produced by nonlinear processing in the respective frequency band. The normalized components CN1 to CN9 are provided separately to the machine learning unit ML2.

This is done without combining the normalized components CN1 to CN9 into one medical image. The advantage of this approach is that it allows the machine learning unit ML2 to exploit the information provided by the normalized image components in a more flexible way. The machine learning unit ML2 executes the training with the normalized image components. Training results are improved in that unpredictable results due to mismatches between training and testing conditions produced by various image impressions are mitigated.

Possible alternatives to pyramid decomposition with task-specific number of frequency bands are, e.g. configurable decompositions based on the wavelet, Fourier or Laplacian transformation.

Alternative solutions exist for normalization. Besides adjusting the pixel values of the individual band-pass images globally (i.e., based on the histogram of the entire band-pass image, e.g., by way of histogram equalization or mean and variance normalization), the band-pass images could be normalized on a spatially local manner. For instance, by exploiting the identification of anatomical structures or by using a sliding window as similarly applied for adaptive histogram equalization. Independent of the dedicated normalization concept, an alternative to manually set the respective hyperparameters is to represent the normalization as part of the processing carried out by the machine learning unit ML2 and thus to learn them in an end-to-end way (i.e., during the training phase).

The machine learning unit ML, ML2 is preferably a neural network NN. In a specific embodiment a neural network is a deep neural network with more than two layers. In a further embodiment the normalized components CN1 to CNn are input as feature maps of a convolutional layer of the deep neural network. This further improves the training results.

Figures 3, 4:
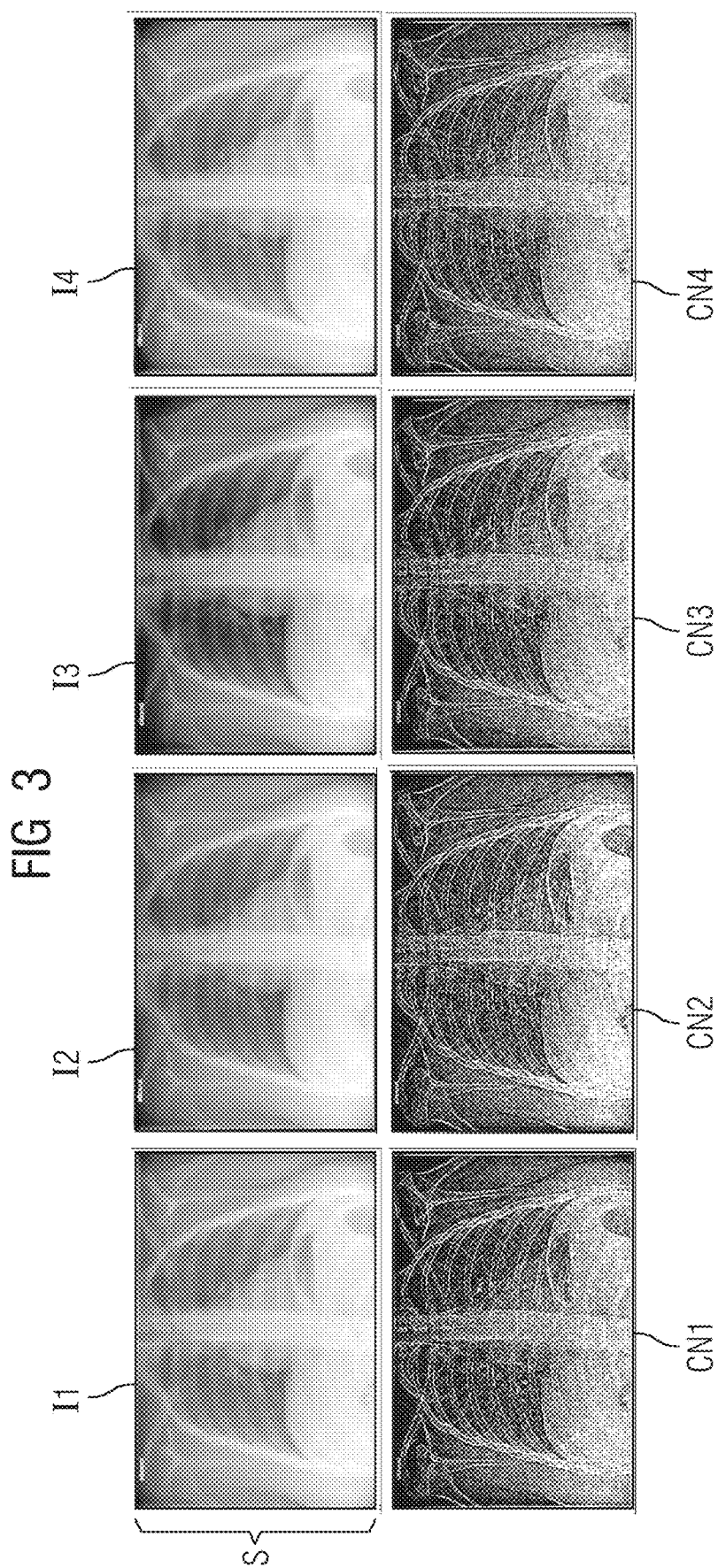
FIG. 3 shows example images with and without the normalization method
FIG. 4 is a flow chart with a sequence of method steps of the normalizing method according to a preferred embodiment of the invention.

FIG. 3 shows example images for four different image impressions without (upper row) and with (lower row) applying the normalization procedure according to the invention. The nine histogram normalized frequency components CN1 to CNn of FIG. 2 are superimposed. By comparing the original images (upper row) with the respective normalized images (lower row), it becomes obvious that the inventive normalization method unifies the image appearance.

FIG. 4 shows a flow chart with a sequence of method steps. In step S1 a set of image data with images is received at a decomposition unit or at another unit and provided to the decomposition unit. In step S2 the received image is decomposed for providing decomposed or band pass images. In step S3 the decomposed images are normalized. After this, the method may end or may optionally be extended by step S4, which relates to resampling the normalized images. Optionally, a verification algorithm may be executed on the result dataset with the normalized images.

A single unit or device may fulfil the functions of several items recited in the claims. The mere fact that certain measures are recited in mutually different dependent claims does not indicate that a combination of these measures cannot be used to advantage.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

Embodiments of the present invention has been described in the general context of computer-executable instructions, such as program modules, being executed by a personal computer. However, the methods of embodiments of the present invention may be effected by other apparatus. Program modules may include routines, programs, objects, components, data structures, etc. that perform a task(s) or implement particular abstract data types. Moreover, those skilled in the art will appreciate that at least some aspects of the present invention may be practiced with other configurations, including hand-held devices, multiprocessor systems, microprocessor-based or programmable consumer electronics, network computers, minicomputers, set top boxes, mainframe computers, and the like. At least some aspects of the present invention may also be practiced in distributed computing environments where tasks are performed by remote processing devices linked through a communications network. In a distributed computing environment, program modules may be located in local and/or remote memory storage devices.

Any reference signs in the claims should not be construed as limiting the scope.

Wherever not already described explicitly, individual embodiments, or their individual aspects and features, described in relation to the drawings can be combined or exchanged with one another without limiting or widening the scope of the described invention, whenever such a combination or exchange is meaningful and in the sense of this invention. Advantages which are described with respect to a particular embodiment of present invention or with respect to a particular figure are, wherever applicable, also advantages of other embodiments of the present invention.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A computer-implemented method for normalizing images from a type of image acquisition device, the computer-implemented method comprising:
   receiving, at a decomposition unit, a set of image data with images, the image data having been generated by being converted from detector signals acquired at a detector of an image acquisition device, wherein the detector signals were converted by applying different settings of image acquisition device-specific processing algorithms;
   decomposing, at the decomposition unit, each of the images of the set of image data into components by incorporating at least information from the different settings of the image acquisition device-specific processing algorithms;
   normalizing, at a normalizing unit, each of the components via a first machine learning unit to produce normalized components, by processing at least information from the different settings of the image acquisition device-specific processing algorithms to provide a set of normalized images with a decreased variability score; and
   receiving the normalized components at an input interface of a second machine learning unit and executing a machine learning algorithm with the normalized components for a defined task, wherein
      the normalized components are entered as feature maps of a convolutional layer of a neural network, and
      during training of the first machine learning unit and the second machine learning unit, at least a part of a plurality of parameters of the first machine learning unit are jointly trained with parameters used and processed in the second machine learning unit using a same cost function.

2. The computer-implemented method of claim 1, wherein at least one of the first machine learning unit or the second machine learning unit is a neural network.

3. The computer-implemented method of claim 1, wherein decomposing comprises a pyramid decomposition.

4. The computer-implemented method of claim 1, wherein each of the images is decomposed into frequency bands, resulting in band-pass images.

5. The computer-implemented method of claim 1, wherein the decomposing is executed by wavelet transformation or by Fourier transformation or by Laplace transformation.

6. The computer-implemented method of claim 1, wherein the normalizing of each of the components is executed by histogram equalization.

7. The computer-implemented method of claim 1, further comprising:
   resampling each of the components with respect to resolution.

8. The computer-implemented method of claim 4, wherein the normalizing includes a global normalization and a local normalization on the components by locally normalizing all components in a spatially local manner.

9. The computer-implemented method of claim 1, wherein the normalizing of the components via the first machine learning unit is executed by at least one of
   processing anatomical information including identification of anatomical structures in the images, or
   processing at least one of patient information or image acquisition device specific information, including patient characteristics and relative positioning of a patient in the image acquisition device.

10. The computer-implemented method of claim 1, wherein the normalizing includes using a sliding window.

11. A system for normalizing medical images from a type of image acquisition device, the system comprising:
a decomposition unit including an image input interface to receive a set of image data with images, the image data having been generated by being converted from detector signals, acquired at a detector of an image acquisition device, the detector signals having been converted by applying different settings of image acquisition device-specific processing algorithms, wherein
the decomposition unit is configured to decompose each of the images of the set of image data into components by incorporating at least information from the different settings of the image acquisition device-specific processing algorithms; and
a normalizing unit configured to normalize each of the components via a first machine learning unit to produce normalized components, by processing at least information from the different settings of the image acquisition device-specific processing algorithms to provide a set of normalized images with a decreased variability score; wherein
the normalized components are received at an input interface of a second machine learning unit and a machine learning algorithm is executed with the normalized components for a defined task,
the normalized components are entered as feature maps of a convolutional layer of a neural network, and
during training of the first machine learning unit and the second machine learning unit, at least a part of a plurality of parameters of the first machine learning unit are jointly trained with parameters used and processed in the second machine learning unit using a same cost function.

12. A non-transitory computer program product storing a computer program, the computer program being loadable into a memory unit of a computing unit and including program code sections to cause the computing unit to, when the computer program is executed in the computing unit, perform a method comprising:
receiving a set of image data with images, the image data having been generated by being converted from detector signals acquired at a detector of an image acquisition device, wherein the detector signals were converted by applying different settings of image acquisition device-specific processing algorithms;
decomposing each of the images of the set of image data into components by incorporating at least information from the different settings of the image acquisition device-specific processing algorithms;
normalizing each of the components via a first machine learning unit to produce normalized components, by processing at least information from the different settings of the image acquisition device-specific processing algorithms to provide a set of normalized images with a decreased variability score; and
receiving the normalized components at an input interface of a second machine learning unit and executing a machine learning algorithm with the normalized components for a defined task, wherein
the normalized components are entered as feature maps of a convolutional layer of a neural network, and
during training of the first machine learning unit and the second machine learning unit, at least a part of a plurality of parameters of the first machine learning unit are jointly trained with parameters used and processed in the second machine learning unit using a same cost function.

13. An image acquisition device, comprising:
a system for normalizing medical images from a type of image acquisition device, the system including
a decomposition unit including an image input interface to receive a set of image data with images, the image data having been generated by being converted from detector signals, acquired at a detector of an image acquisition device, the detector signals having been converted by applying different settings of image acquisition device-specific processing algorithms, wherein
the decomposition unit is configured to decompose each of the images of the set of image data into components by incorporating at least information from the different settings of the image acquisition device-specific processing algorithms, and
a normalizing unit configured to normalize each of the components via a first machine learning unit to produce normalized components, by processing at least information from the different settings of the image acquisition device-specific processing algorithms to provide a set of normalized images with a decreased variability score, wherein
the normalized components are received at an input interface of a second machine learning unit and a machine learning algorithm is executed with the normalized components for a defined task,
the normalized components are entered as feature maps of a convolutional layer of a neural network, and
during training of the first machine learning unit and the second machine learning unit, at least a part of a plurality of parameters of the first machine learning unit are jointly trained with parameters used and processed in the second machine learning unit using a same cost function.

14. The computer-implemented method of claim 1, wherein the first machine learning unit is a neural network.

15. The computer-implemented method of claim 2, wherein the neural network is a deep neural network or a deep convolutional neural network.

16. The computer-implemented method of claim 14, wherein the neural network is a deep neural network or a deep convolutional neural network.

17. The computer-implemented method of claim 2, wherein the decomposing is executed by wavelet transformation, by Fourier transformation, or by Laplace transformation.

18. The computer-implemented method of claim 2, wherein the normalizing of each of the components is executed by histogram equalization.

* * * * *